No. 896,056. PATENTED AUG. 11, 1908.
O. COLBORNE.
PIE MACHINE.
APPLICATION FILED SEPT. 6, 1907.

2 SHEETS—SHEET 1.

Witnesses
Ray White.
M. H. Olsen

Inventor
Oliver Colborne,
By Kummler & Kummler
Attys

No. 896,056. PATENTED AUG. 11, 1908.
O. COLBORNE.
PIE MACHINE.
APPLICATION FILED SEPT. 6, 1907.

2 SHEETS—SHEET 2.

Witnesses
Ray White.
M. H. Olsen.

Inventor
Oliver Colborne,
By Rummler & Rummler
Attys

UNITED STATES PATENT OFFICE.

OLIVER COLBORNE, OF CHICAGO, ILLINOIS.

PIE-MACHINE.

No. 896,056.

Specification of Letters Patent.

Patented Aug. 11, 1908.

Application filed September 6, 1907. Serial No. 391,611.

*To all whom it may concern:*

Be it known that I, OLIVER COLBORNE, a citizen of the United States of America, and a resident of Chicago, Cook county, and State of Illinois, have invented certain new and useful Improvements in Pie - Machines, of which the following is a specification.

Figure 1:
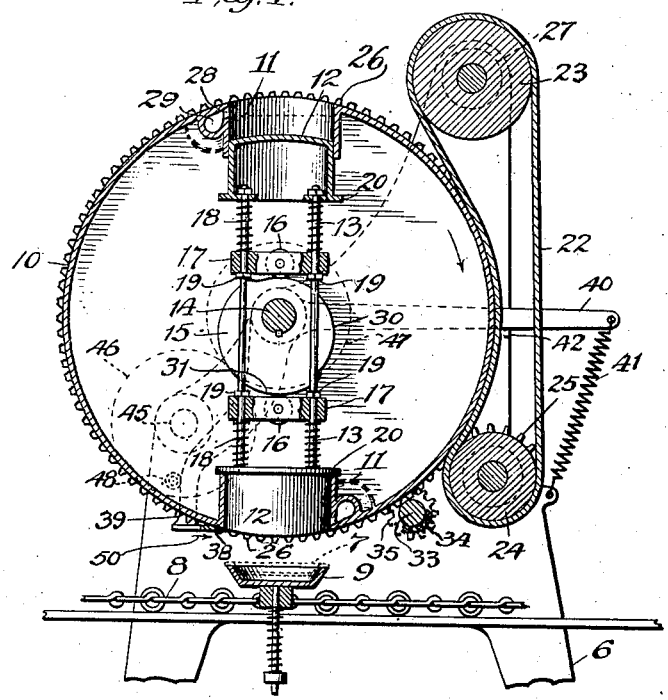
Figure 2:
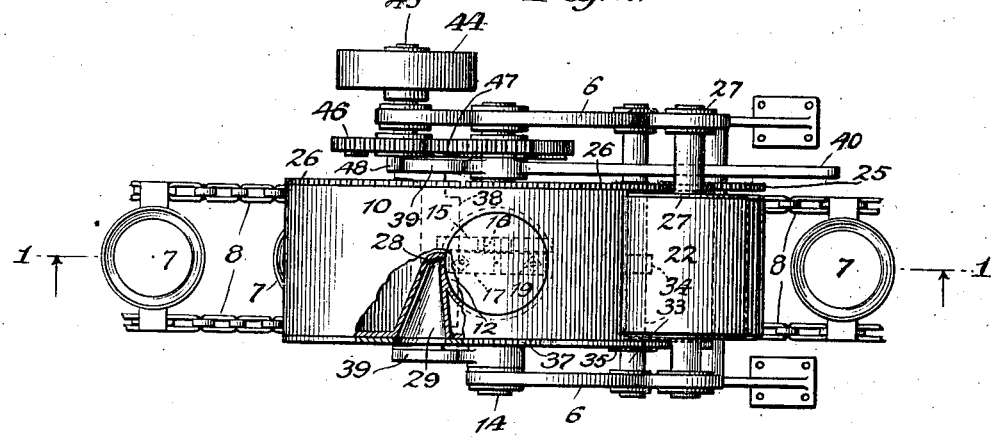
Figure 3:
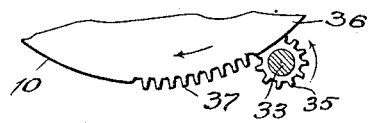
Figure 4:
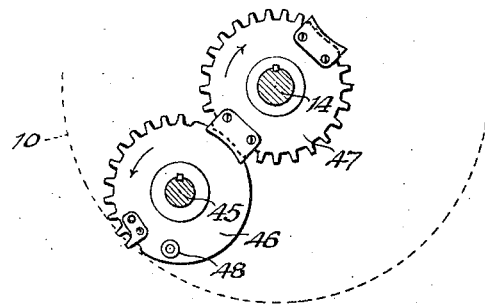
Figure 5:
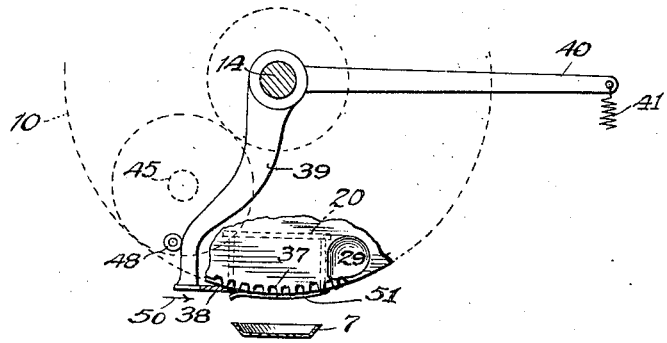

The main objects of this invention are to provide an improved form of pie machine adapted to form masses of dough into thin, substantially circular sheets and automatically deliver the same in succession upon a series of pie tins; to provide a machine of this type in which the pie crusts are formed with a minimum amount of "working" of the dough; to provide improved means for marking the dough of upper crusts to indicate the contents of the pie; and to provide an improved form of crust forming mechanism which insures perfect regularity in the size of the crusts and reduces the amount of dough which must be trimmed from the completed pies. These objects are accomplished by the device shown in the accompanying drawings, in which Figure 1 is a vertical section of a pie machine constructed according to this invention, the lower plunger 12 being shown in elevation, the supporting frame and conveyer for the pie tins being partly broken away and the operating mechanism of the conveyer being omitted. Fig. 2 is a top plan of the same also partly broken away. Fig. 3 is a detail indicating the method of operating the marker. Fig. 4 is a detail of the mutilated gearing which controls the relative operations of the molding cylinder and the scraper which removes the completed crust from the cylinder. Fig. 5 is a detail showing the shape of the scraper arm and the relation of the scraper to the periphery of the cylinder.

In the drawings, the supporting frame is indicated at 6. In the form shown, the pie tins 7 are supported by a horizontally disposed conveyer 8. The conveyer shown comprises a pair of parallel link belts supporting between them a series of supports 9 each having thereon a seat for a pie tin. The mechanism for driving the conveyer is not shown in the drawings but it will be readily seen by those skilled in this art that the crust forming and delivering mechanism herein shown is, with such slight modification in the driving gears as would readily occur to a skilled mechanic, suitable for either continuous or intermittent operation of the conveyer. In the specific form shown in the drawings, the conveyer is presumed to operate intermittently so as to successively stop the pie tins in the position of Fig. 1.

The crust forming mechanism comprises a cylindrical member 10, journaled on a horizontally disposed axis directly above one of the supports of the conveyer when in its stopped position, and provided with a pair of diametrically opposed crust forming pockets 11. The pockets 11 are preferably of circular form, as indicated in Fig. 2, and are of a size slightly larger than the diameter of the pie tin 7, so as to allow a slight excess of dough to be later trimmed off the edges of the pies and insure perfectly fitting crusts. The pockets 11 are in alinement with each other and each is provided with a movable bottom consisting of a plunger 12, whose outer end corresponds in shape exactly with the periphery of the member 10. The plungers 12 are rigidly connected together by a pair of rods 13, and are so adjusted that one will be at the inner end of its stroke when the other is at the outer end of its stroke. The member 10 is loosely journaled on a fixed shaft 14 upon which is mounted a fixed cam 15 whose periphery is of suitable shape to cause the plunger 12 which is uppermost to be gradually moved outward during the rotation of the member 10, and to be brought to a position flush with the periphery of said member when it arrives at a certain point at the lower part of said member. This movement is imparted to the plungers 12 by means of rollers 16, which are carried by yokes 17 slidably mounted on the rods 13 with springs 18 interposed between said yokes and the adjacent plungers. The stops 19 limit the movement of the yokes 17 towards each other, but the springs 18 permit the yokes to yield so that the throw of the cam may be slightly in excess of that of the plungers 12. This arrangement insures that the plungers 12 are always forced outward to their extreme limit when in the lower part of their path, regardless of wear of the cam surface. This outward movement of the plungers is limited by stops 20.

An endless belt or apron 22 is carried by rollers 23 and 24 and extends partly around the periphery of the member 10 between the upper and lower positions of the pockets 11. The apron 22 is driven by the gear 25, which meshes with a gear 26 at one end of the member 10. The roller 23 is mounted in an eccentric bearing 27 which permits of tightening the apron 22 so that the same bears firmly against the periphery of the member 10 and serves to close the open end of the pocket 11 and cause the mass of dough to be compressed into a thin sheet, while said pocket is opposed to the apron. The pockets 11 are provided with apertures 28 at one side to permit an excess of dough to escape and thus insure uniformity in the thickness of the crusts which are formed. The opening 28 leads into a pocket 29 which opens out at one end of the cylinder to permit the dough to be discharged therefrom. The pocket 29 is preferably gradually enlarged toward its open end so as to permit an operator to insert his hand for the purpose of pulling out the dough if necessary. The thickness of the crust is determined by the part 30 of the periphery of the cam 15. The periphery of the cam is jogged outward at 31 so as to force the plunger 12 outward flush with the periphery of the member 10 after it is clear of the apron. This part of the periphery of the cam is concentric with the axis of the member 10.

The device for marking the crusts to indicate the contents of the pie consists of a roller 33, a portion 34 of whose periphery is raised to correspond with the mark which is to be impressed. The remaining portions of the periphery are of such diameter as to stand clear of the periphery of the member 10 and permit the dough to pass between. The marking roller 33 is driven by a mutilated pinion 35 which meshes with a mutilated gear 36 at one end of the cylinder 10. The gear 36 has teeth 37 only for a short angular distance adjacent to each of the pockets 11. The roller 33 is therefore normally at rest except when a pie crust is passing it and is then rotated by the mutilated gears so as to impress the mark at the middle of the crust.

The pie crust is removed from the roller by means of a scraper 38 whose edge fits tightly against the periphery of the member 10. The scraper 38 is carried by a pair of arms 39 which are loosely journaled concentrically of the member 10. One of these arms is provided with an extension 40 to which is attached a spring 41 which normally urges the scraper to its normal position shown in Fig. 1. A stop 42 on the supporting frame limits the movement of the extension 40.

Power is applied to the device from a pulley 44, which is mounted on the driving shaft 45. In the form shown, a pair of mutilated gears 46 and 47 connect the driving shaft 45 with the member 10. These gears are so formed that the member 10 will make one-half rotation during each complete rotation of the shaft 45, the movement of the member 10 being thus intermittent while the shaft 45 is continuously rotated. The roller stud 48 on the gear 46 engages the adjacent arm 39 of the scraper and forces said scraper in the direction of the arrow 50, Fig. 5, during the first part of the interval when the member 10 is at rest. This removes the pie crust indicated at 51 in Fig. 5, and causes it to fall upon the pie tin 7 below. As soon as the crust has been removed, the spring 41 returns the scraper 38 to its normal initial position.

The operation of the device shown is as follows: The shaft 45 is continuously rotated but on account of the shape of the mutilated gears 46 and 47, it is effective for rotating the member 10 during only one-half of its revolution. The member 10 therefore rotates intermittently one-half revolution at a time. The gears 46 and 47 are so placed that the pockets are in the position shown in Fig. 1 when the device is at rest. The operator places into the uppermost pocket 11 a mass of dough, preferably slightly in excess of the exact amount required to form a pie crust. At the next rotation of the member 10 this dough is carried around and while it is in opposition to the apron 22, the cam 15 forces the plunger 12 outward until the dough has been pressed to a circular sheet of the desired thickness. After the dough has passed clear of the roller 24, the plunger 12 is forced to a position flush with the surface of the member 10. While the dough is passing the marking roller 33, said roller is rotated by its mutilated gears and impresses a mark upon the crust. The member 10 comes to rest with the crust in a position directly above one of the supports 9 of the conveyer. The action of the roller stud 48 upon the arm 39 at this time causes the scraper 38 to swing in the direction of the arrow 50, dislodging the crust and causing it to fall upon the pie tin 7. The conveyer is driven intermittently to successively advance the tins to loading position and its intervals of rest correspond with those of the crust forming mechanism.

In the complete machine two crust forming devices such as are herein shown are provided for forming the upper and lower crusts of the pie. The marker is required only in the case of the crust forming device which forms the upper crust.

What I claim as my invention and desire to secure by Letters Patent is:—

1. In a pie machine, the combination of a member journaled on a horizontally disposed axis, mechanism for forming a pie crust on said member, a support having a seat for a pie tin located below the path of pie crusts on said member, and a scraper adapted to free the crust from said member and cause the same to be deposited upon a tin on said seat.

2. In a pie machine, the combination of a support having a seat for a pie tin, a member located above said support and adapted to carry a pie crust on its periphery to a position directly above said seat, and a scraper co-acting with said member to remove the crust and cause it to fall upon a tin on said seat.

3. A pie machine comprising a member, journaled on a horizontally disposed axis, means for causing a pie crust to adhere to the periphery of said member, a support below said member having formed thereon a seat for a pie tin, a scraper located between said member and support, and operating mechanism adapted to move said scraper and member relatively of each other to discharge the crust from said member and deposit it upon said seat.

4. In a pie machine, the combination of a support for a pie tin, an intermittently movable member located above said support and adapted to carry a pie crust on the lower side of its periphery to a position above said support, and a movable scraper mounted to engage the periphery of said member and remove the crust therefrom while it is in position to fall on said support.

5. In a pie machine, the combination of a support for a pie tin, a member located above said support and adapted to carry a pie crust on its periphery to a position above said support, a movable scraper co-acting with said member to remove such crust and cause it to fall upon a tin on said support, and mechanism for intermittently moving said member to bring successive crusts into position for being deposited in a position near said scraper and adapted to operate said scraper during intervals when said member is at rest.

6. In a pie machine, the combination of a member journaled on a horizontally disposed axis, means co-acting with said member to form a pie crust on the periphery thereof, a support having a seat for a pie tin mounted below the lower part of the periphery of said roller, and a scraper suitably mounted adjacent to the periphery of said roller to remove the pie crust therefrom and cause it to be deposited directly upon a tin on said seat.

7. In a pie machine, the combination of a conveyer having thereon a series of supports for pie tins, a member located above said conveyer and adapted to carry a pie crust on the lower part of its periphery to a position above said conveyer, and means for causing the crust to fall directly from said member to a tin on said conveyer.

8. In a pie machine, the combination of a crust forming member journaled on a horizontally disposed axis, mechanism co-acting therewith to form a pie crust thereon, an arm mounted to oscillate on the axis of said member and having thereon a scraper disposed adjacent to the periphery of said member, mechanism for intermittently rotating said member to bring successive crusts to the lower part of the periphery thereof, and means for oscillating said arm to remove a pie crust from said member while such crust is at the lower part of the periphery thereof.

9. In a pie machine, the combination of a roller having a pocket in its periphery, a movable bottom in said pocket, a movable apron disposed along a part of the path of movement of said pocket and adapted to close the mouth of said pocket during part of the revolution of said roller, mechanism for moving said bottom outwardly while opposed to said apron for molding a mass of dough into a thin sheet in said pocket during its passage along said apron, said pocket having an outlet opening to permit the escape of an excess of dough, and a second pocket in said roller communicating with said excess outlet.

10. In a pie machine, the combination of a support having a seat for a pie tin, a member located above said support and adapted to carry a pie crust on its periphery to a position directly above said seat, a scraper coacting with said member to remove the crust and cause it to fall upon a tin on said seat, a marker coacting with the periphery of said member, and mechanism adapted to operate said member and marker so as to cause said marker to mark the crust in its passage to said support.

11. In a pie machine, the combination of a crust forming roller, mechanism coacting therewith to form a pie crust on the periphery thereof, a marking roller having its periphery opposed to that of said crust forming roller, and mechanism connecting said roller and marker and controlling the relative operation thereof, so as to cause said marker to impress a mark upon each pie crust during its passage around said roller.

12. A pie crust forming device, comprising a pair of members having rolling contact with each other and adapted to form a mass of dough into a thin sheet when passed between said members, a scraper opposed to the periphery of one of said members and adapted to remove the pie crust therefrom, and a marking roller journaled adjacent to the periphery of said one member between said other member and said scraper and adapted to impress a mark upon the sheet of dough after the same has passed from between said members.

13. In a pie machine, the combination of a rotating member having a pocket in its periphery, said pocket having a movable bottom, an apron extending partly around the periphery of said member, mechanism for moving said bottom outwardly while said pocket is opposed to said apron for molding a mass of dough in said pocket, said mechanism being adapted to shift said bottom outward flush with the periphery of said member after said pocket has passed said apron, a support for a pie tin disposed directly below the path of said pocket, and a scraper adapted to remove the dough from said bottom and cause the same to fall upon a tin on said support while said pocket is opposite said support.

14. The combination of a pair of co-acting members, one having therein a pocket provided with a movable bottom and adapted to mold between said members a mass of dough placed in said pocket, mechanism for moving said bottom flush with the periphery of said one member after said pocket has passed the other member, a scraper located below said one member and in contact with the periphery thereof and adapted to remove the dough from said bottom, and a marker located between said scraper and said other member and adapted to co-act with said bottom for impressing a mark on said dough.

15. In a pie machine, the combination of a movable molding member having therein a pocket, a movable bottom in said pocket, a second member adapted to close said pocket and movable therewith during a part of the movement of said pocket, mechanism for shifting said bottom outwardly while opposed to said second member and adapted to compress a mass of dough in said pocket into a thin sheet, said mechanism being adapted to shift said bottom outward flush with the periphery of said pocketed member after said pocket has passed clear of said second member, a support having thereon a seat for a pie tin located below said pocketed member, and a scraper adapted to remove the pie crust and cause it to fall directly upon a tin on said support.

Signed at Chicago this 27th day of July 1907.

OLIVER COLBORNE.

Witnesses:
J. HOMER SULLIVAN,
WM. R. RUMMLER.